United States Patent
Wakebe et al.

(10) Patent No.: US 9,751,246 B2
(45) Date of Patent: Sep. 5, 2017

(54) EJECTION CONTROLLER FOR INJECTION MOLDING MACHINE

(71) Applicant: FANUC Corporation, Yamanashi (JP)

(72) Inventors: Shuichi Wakebe, Yamanashi (JP); Shinichi Saitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 26 days.

(21) Appl. No.: 14/875,215

(22) Filed: Oct. 5, 2015

(65) Prior Publication Data

US 2017/0113389 A1  Apr. 27, 2017

(30) Foreign Application Priority Data

Oct. 6, 2014 (JP) .................. 2014-205783

(51) Int. Cl.
  *B29C 45/76* (2006.01)
  *B29C 45/64* (2006.01)
  *B29C 45/40* (2006.01)
  *B29C 45/84* (2006.01)
  *B29C 45/03* (2006.01)

(52) U.S. Cl.
  CPC .......... *B29C 45/7626* (2013.01); *B29C 45/03* (2013.01); *B29C 45/4005* (2013.01); *B29C 45/64* (2013.01); *B29C 45/84* (2013.01); *B29C 2945/76337* (2013.01); *B29C 2945/76722* (2013.01); *B29C 2945/76896* (2013.01); *B29C 2945/76926* (2013.01)

(58) Field of Classification Search
  CPC ..... B29C 47/369; B29C 47/362; B29C 47/54; B29C 47/702; B29C 47/366; B29C 45/0013; B29C 47/0016; B29C 47/0021; B01F 3/1221; B01F 5/0644; B01F 7/086; B01F 15/0404; B01F 5/0601
  USPC .......................... 425/585, 136, 542, 556, 589
  See application file for complete search history.

(56) References Cited

U.S. PATENT DOCUMENTS

| | | | |
|---|---|---|---|
| 6,062,843 A | 5/2000 | Yamaura | |
| 7,517,206 B2 * | 4/2009 | Nishizawa | B29C 45/76 425/143 |
| 2002/0056933 A1 | 5/2002 | Kamiguchi et al. | |
| 2003/0074103 A1 * | 4/2003 | Fujiki | B29C 45/76 700/197 |
| 2004/0051194 A1 | 3/2004 | Yamazaki et al. | |

(Continued)

FOREIGN PATENT DOCUMENTS

| | | |
|---|---|---|
| JP | 62-148230 A | 7/1987 |
| JP | 5-162176 A | 6/1993 |

(Continued)

OTHER PUBLICATIONS

Decision to Grant a Patent in JP Application No. 2014-205783, mailed Jan. 5, 2016.

*Primary Examiner* — Nahida Sultana
(74) *Attorney, Agent, or Firm* — Hauptman Ham, LLP

(57) ABSTRACT

An ejection controller for an injection molding machine has a function of interrupting ejection by an ejection device before the ejection is completed, a function of detecting closing of an open safety door surrounding a mold clamping unit of the injection molding machine, and a function of restarting the ejection by the ejection device when the closing of the open safety door is detected while the ejection device is interrupted.

10 Claims, 7 Drawing Sheets

(56) References Cited

U.S. PATENT DOCUMENTS

| | | | | |
|---|---|---|---|---|
| 2007/0158867 | A1* | 7/2007 | Hofmann | B29C 45/76 264/40.1 |
| 2008/0233227 | A1* | 9/2008 | Onishi | B29C 45/17 425/136 |
| 2016/0167266 | A1* | 6/2016 | Wakebe | B29C 45/7626 382/141 |

FOREIGN PATENT DOCUMENTS

| | | |
|---|---|---|
| JP | 10-296818 A | 11/1998 |
| JP | 2000-052383 A | 2/2000 |
| JP | 2002-144383 A | 5/2002 |
| JP | 2004-106272 A | 4/2004 |
| JP | 2009-274356 A | 11/2009 |
| JP | 2011-136512 A | 7/2011 |

* cited by examiner

EJECTION CONTROLLER FOR INJECTION MOLDING MACHINE

RELATED APPLICATIONS

The present application claims priority to Japanese Application Number 2014-205783, filed Oct. 6, 2014, the disclosure of which is hereby incorporated by reference herein in its entirety.

BACKGROUND OF THE INVENTION

Field of the Invention

The present invention relates to an ejection controller of a molded article ejection device, such as an ejector, for an injection molding machine.

Description of the Related Art

In starting molding operation or adjusting molding conditions in an injection molding machine, an operator may sometimes open a safety door that covers the injection molding machine, and then remove molded articles and check them for condition.

In conventional techniques, molded articles are checked after they are ejected by an ejector. If a large number of molded articles are handled, in particular, it may not be easy to identify the cavity in which the article ejected and dropped last is molded.

Japanese Patent Application Laid-Open No. 2000-52383 discloses a technique in which molded articles are removed by a molded article removing machine after a mold supported on a mold clamping device is opened. In doing this, a movable mold half is moved in its opening direction as the molded articles are ejected in a molded article holding position of the movable mold half. Thus, the simultaneously ejected molded articles can be held by the molded article removing machine.

In the technique disclosed in the patent document described above, however, the molded article removing machine is needed to remove the molded articles, so that it may sometimes be troublesome to check the molded articles for condition.

Japanese Patent Application Laid-Open No. 2002-144383 discloses a technique in which a mold release force is obtained from the difference between a load applied to an ejector mechanism driven without performing molding and a load applied to the ejector mechanism driven while performing molding, in order to measure an accurate mold release force in an injection molding machine.

In the technique disclosed in the patent document described above, however, an operator cannot check molded articles for condition, although the mold release force of the ejector mechanism in the injection molding machine can be accurately measured based on the load applied to the ejector mechanism.

Japanese Patent Application Laid-Open No. 2011-136512 discloses a technique in which an optimal retract end position of an ejector is detected and set to prevent breakage of an ejector device or a mold or extension of the molding cycle time that may lower the production efficiency.

In the technique disclosed in the patent document described above, however, an operator cannot check molded articles for condition, although the retract end position of the ejector mechanism in the injection molding machine can be accurately set.

SUMMARY OF THE INVENTION

Accordingly, an object of the present invention is to provide an ejection controller for an injection molding machine, configured so that ejection can be stopped in a predetermined position to enable an operator to manually remove molded articles and a molded article in a desired cavity can be selectively removed without being damaged.

In an ejection controller for an injection molding machine according to the present invention, the injection molding machine comprises a mold clamping unit, an injection unit, a mold unit, an ejection device for releasing a molded article of a resin from the mold unit after the resin injected from the injection unit into the mold unit is molded, and a cover unit provided at least around the mold clamping unit and comprising a safety door capable of being opened and closed. On the other hand, the ejection controller comprises an ejection interruption control unit configured to interrupt ejection by the ejection device before the ejection is completed, a safety door closing detection unit configured to detect closing of the safety door in an open state, and an ejection restart control unit configured to restart the ejection by the ejection device when the safety door closing detection unit detects the closing of the open safety door while the ejection device is interrupted by the ejection interruption control unit.

The ejection interruption control unit may be configured to interrupt the ejection by the ejection device in a predetermined ejection interrupting position.

The ejection controller may further comprise an ejection load detection unit configured to detect a value of an ejection load of the ejection device, and the ejection interruption control unit may be configured to interrupt the ejection by the ejection device when the ejection load value detected by the ejection load detection unit exceeds a predetermined first threshold after the ejection by the ejection device is started, and thereafter, the detected ejection load value falls below a predetermined second threshold lower than the first threshold. In this case, the first threshold may be set based on the ejection load value detected by the ejection load detection unit during a dry cycle. Further, a position of the ejection device detected when the ejection by the ejection device is interrupted is set as an ejection interruption setting position, and ejection interrupting positions of the ejection device in subsequent cycles may be set based on the set ejection interruption setting position.

The ejection controller may further comprise an ejection restart instruction input unit of the ejection device, and the ejection restart control unit may be configured to restart the ejection by the ejection device when an ejection restart instruction signal is input from the ejection restart instruction input unit after the closing of the safety door is detected by the safety door closing detection unit.

The ejection interruption control unit may be configured to also stop a mold opening operation when the ejection by the ejection device is interrupted, and the ejection restart control unit may be configured to also restart the mold opening operation when the ejection by the ejection device is restarted.

According to the present invention, there can be provided an ejection controller for an injection molding machine, configured so that ejection can be stopped in a predetermined position to enable an operator to manually remove molded articles and a molded article in a desired cavity can be selectively removed without being damaged.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

A first embodiment of an ejection controller for an injection molding machine according to the present invention will first be described with reference to FIGS. 1 to 6.

Figure 1:
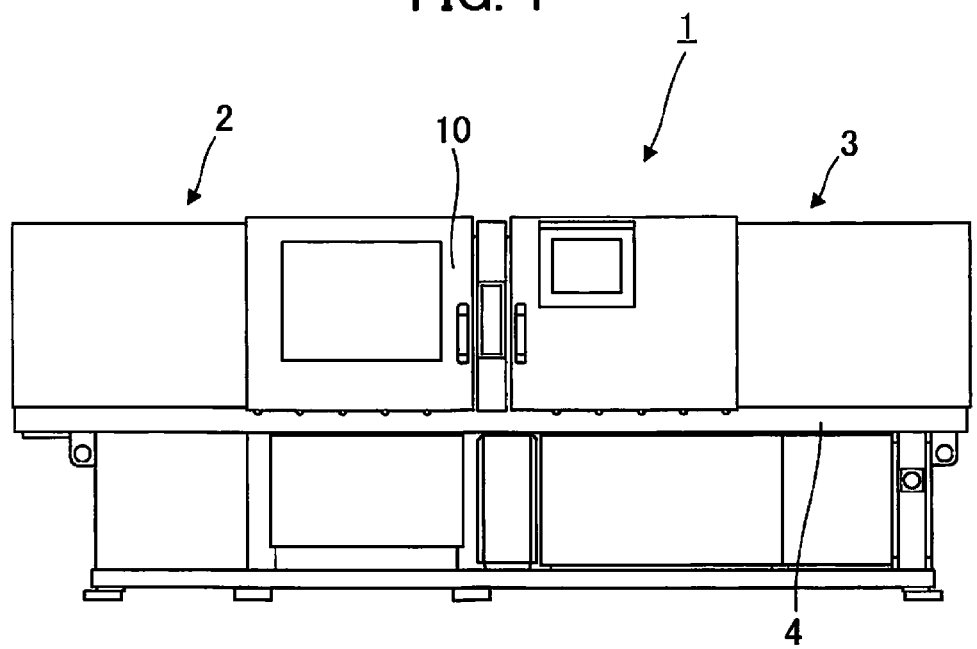
FIG. 1 is a front view showing the structure of an injection molding machine into which an ejection controller according to the present invention is incorporated.

As shown in FIG. 1, an injection molding machine 1 comprises a mold clamping device 2, injection device 3, and machine base 4. The mold clamping device 2 opens and closes a mold to generate a clamping force. The injection device 3 is disposed opposite to the mold clamping device 2 and serves to melt a resin and inject it into the mold. On the machine base 4, the mold clamping device 2 and the injection device 3 are mounted. Both the mold clamping device 2 and the injection device 3 are configured to be enclosed by a cover unit. The mold clamping device 2 is provided with a safety door 10, which is closed while the injection molding machine 1 is operating. In removing a molded article, for example, the operation of the injection molding machine 1 is stopped and the safety door 10 is opened so that the molded article can be taken out of the mold.

Figure 2:
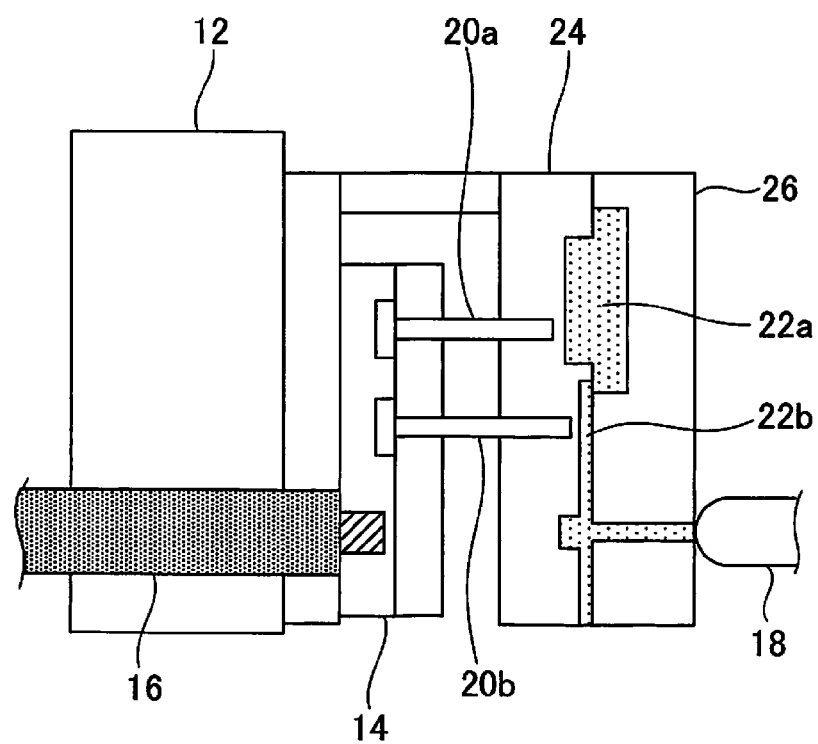
FIG. 2 is a view showing a state before mold opening by a mold clamping device with a cover unit of the injection molding machine of FIG. 1 removed.
Figure 3:
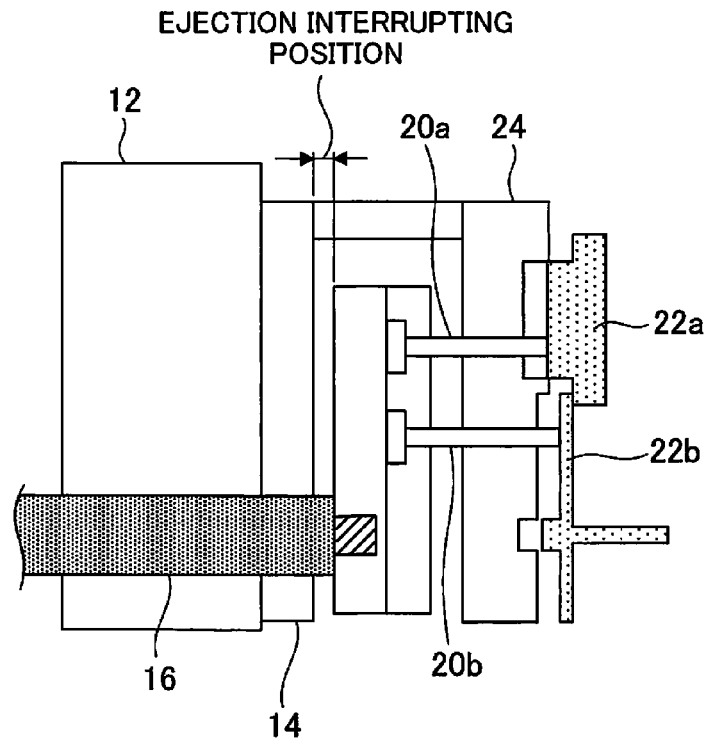
FIG. 3 is a view showing a state in which ejection pins are stopped in an ejection interrupting position in the mold clamping device of FIG. 2.
Figure 4:
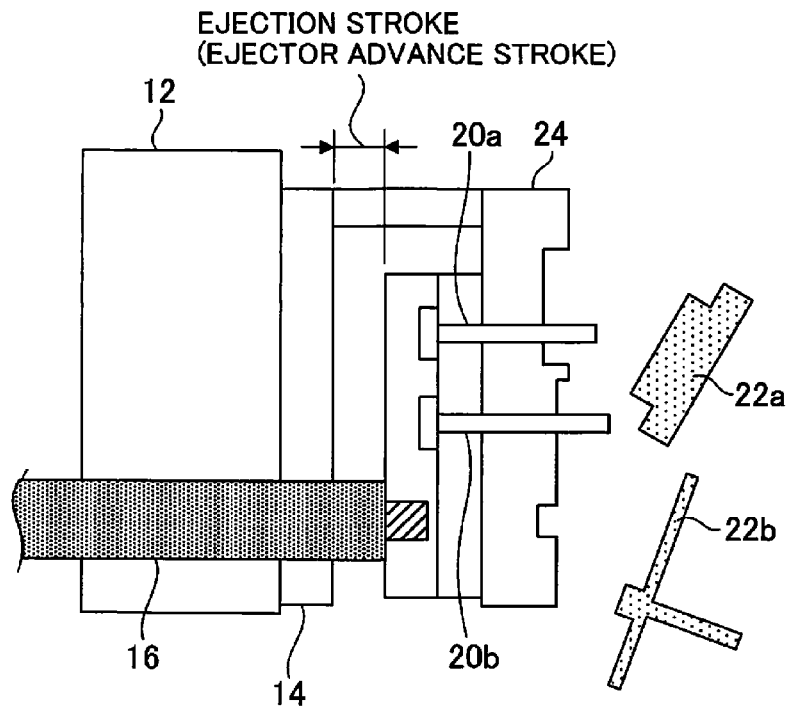
FIG. 4 is a view showing a state in which the ejection pins are advanced by a distance corresponding to the ejector advance stroke in the mold clamping device of FIG. 2.

FIGS. 2 to 4 are views showing the configuration of a mold clamping device 2 with the cover unit removed.

The mold comprises a movable mold half 24 and a fixed mold half 26. The fixed mold half 26 is connected to a fixed platen (not shown), and the fixed and movable mold halves 26 and 24 are disposed opposite to each other. The resin is supplied from a nozzle 18 to an area in which the movable and fixed mold halves 24 and 26 face each other. The resin supplied from the nozzle 18 is formed into molded articles 22a and 22b by clamping the mold (movable and fixed mold halves 24 and 26) of the mold clamping device 2.

An ejector 14 comprises ejection pins 20a and 20b. As an ejector rod 16 is operated for advance and retract, the ejection pins 20a and 20b contact and eject the molded articles 22a and 22b from the mold.

FIG. 2 shows a state before mold opening in which the ejection pins 20a and 20b are in a position off the molded articles 22a and 22b. FIG. 3 shows a state in which the ejection pins 20a and 20b are stopped in an ejection interrupting position. Further, FIG. 4 shows a state in which the ejection pins 20a and 20b are advanced by a distance corresponding to the ejector advance stroke, thereby dropping the molded articles 22a and 22b.

In the ejection interrupting position, as shown in FIG. 3, the molded articles 22a and 22b are stopped in a position where they are somewhat separated and released from the movable mold half 24. When the ejection pins 20a and 20b are stopped in the ejection interrupting position, the molded articles 22a and 22b are stopped in a state which allows an operator to manually take out the molded articles 22a and 22b without dropping.

Figure 5:
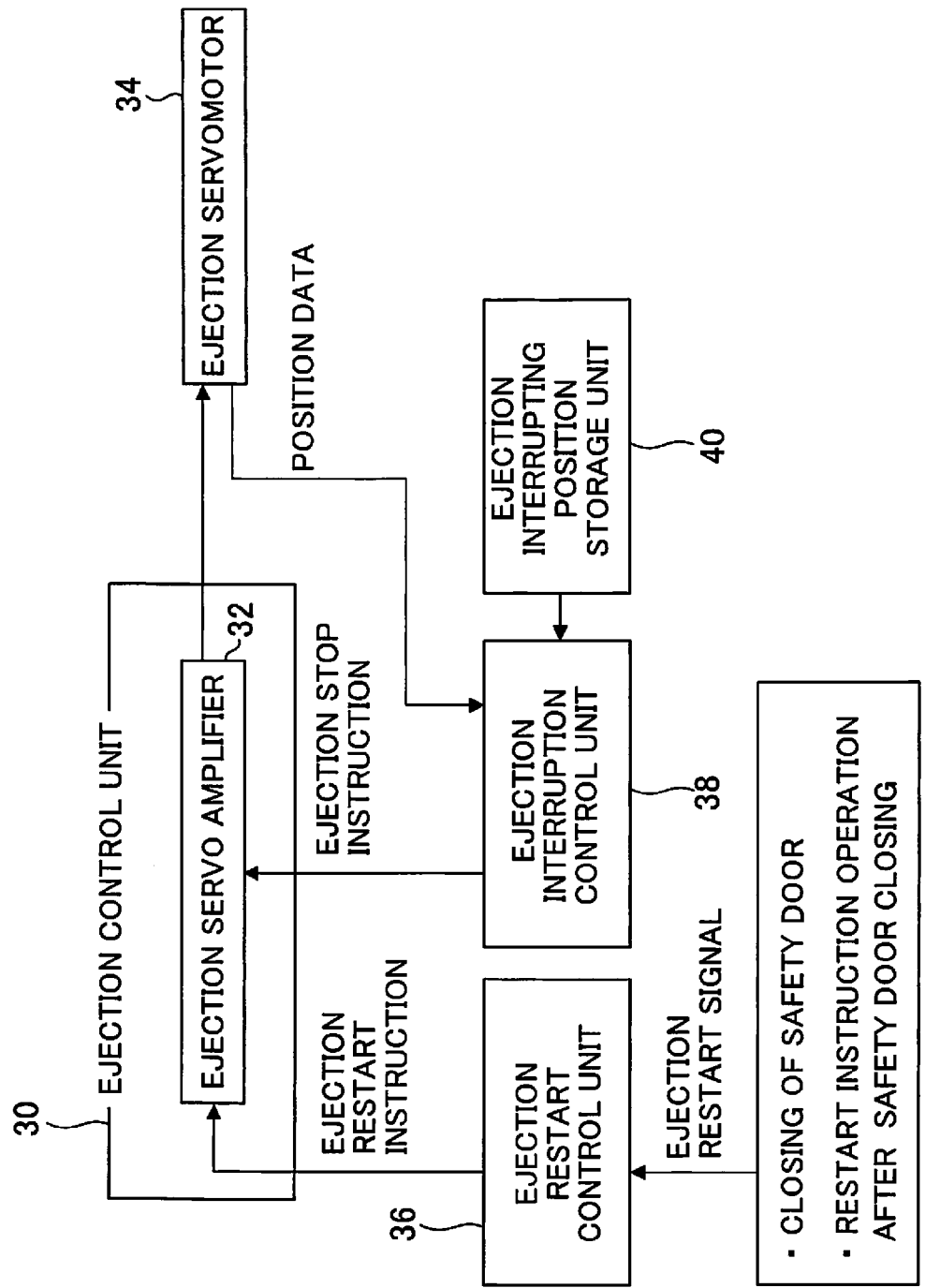
FIG. 5 is a diagram showing the configuration of an ejection control unit of a first embodiment of the ejection controller for the injection molding machine according to the present invention and its surroundings.

FIG. 5 is a diagram showing the configuration of an ejection control unit of the ejection controller for the injection molding machine according to the first embodiment and its surroundings.

An ejection control unit 30 comprises an ejection servo amplifier 32 inside and serves to control the positions of the ejector 14 and the ejection pins 20a and 20b. A signal from the ejection servo amplifier 32 is input to an ejection servomotor 34 such that the position of the ejection pins 20a and 20b is controlled as the ejection servomotor 34 rotates.

An ejection interruption control unit 38 receives position data on the ejection pins 20a and 20b as an input from the ejection servomotor 34 and issues an ejection stop instruction to the ejection servo amplifier 32 in the ejection control unit 30. When the ejection interrupting position is fixed, it is stored into an ejection interrupting position storage unit 40 and is output, when necessary, from the ejection interrupting position storage unit 40 to the ejection interruption control unit 38.

An ejection restart control unit 36 issues an ejection restart instruction after the ejection is interrupted. For the ejection restart instruction, as shown in FIG. 5, an ejection restart signal is output when closing of the safety door 10 is detected or when a restart instruction operation is performed after the closing of the safety door 10 is detected. Based on the output ejection restart signal, the ejection restart instruction is issued from the ejection restart control unit 36 to the ejection servo amplifier 32 in the ejection control unit 30.

In the ejection controller configured as described above, the ejection interruption control unit 38 stops the ejection servomotor 34 for the ejection pins 20a and 20b, based on the ejection restart signal. Based on the ejection restart signal from the ejection restart control unit 36, moreover, ejection is restarted thereafter. Switching to an ejection interruption mode can be facilitated by providing an on-off button for the ejection interruption mode on a display of the injection molding machine 1 or the like, in order to activate the ejection interruption control unit 38.

In a method for setting the ejection interrupting position, the molded articles 22a and 22b are first ejected at low speed in a manual mode, and a position in which the molded articles 22a and 22b naturally drop by their own weight is obtained. This obtained position is not a position reached when the ejection pins 20a and 20b are advanced by the distance corresponding to the ejector advance stroke, as shown in FIG. 4, but a position in which the molded articles 22a and 22b actually naturally drop by their own weight. A suitable position just short (e.g., 2 to 3 mm short) of the position for the natural dropping can be set as the ejection interrupting position.

Figure 6:
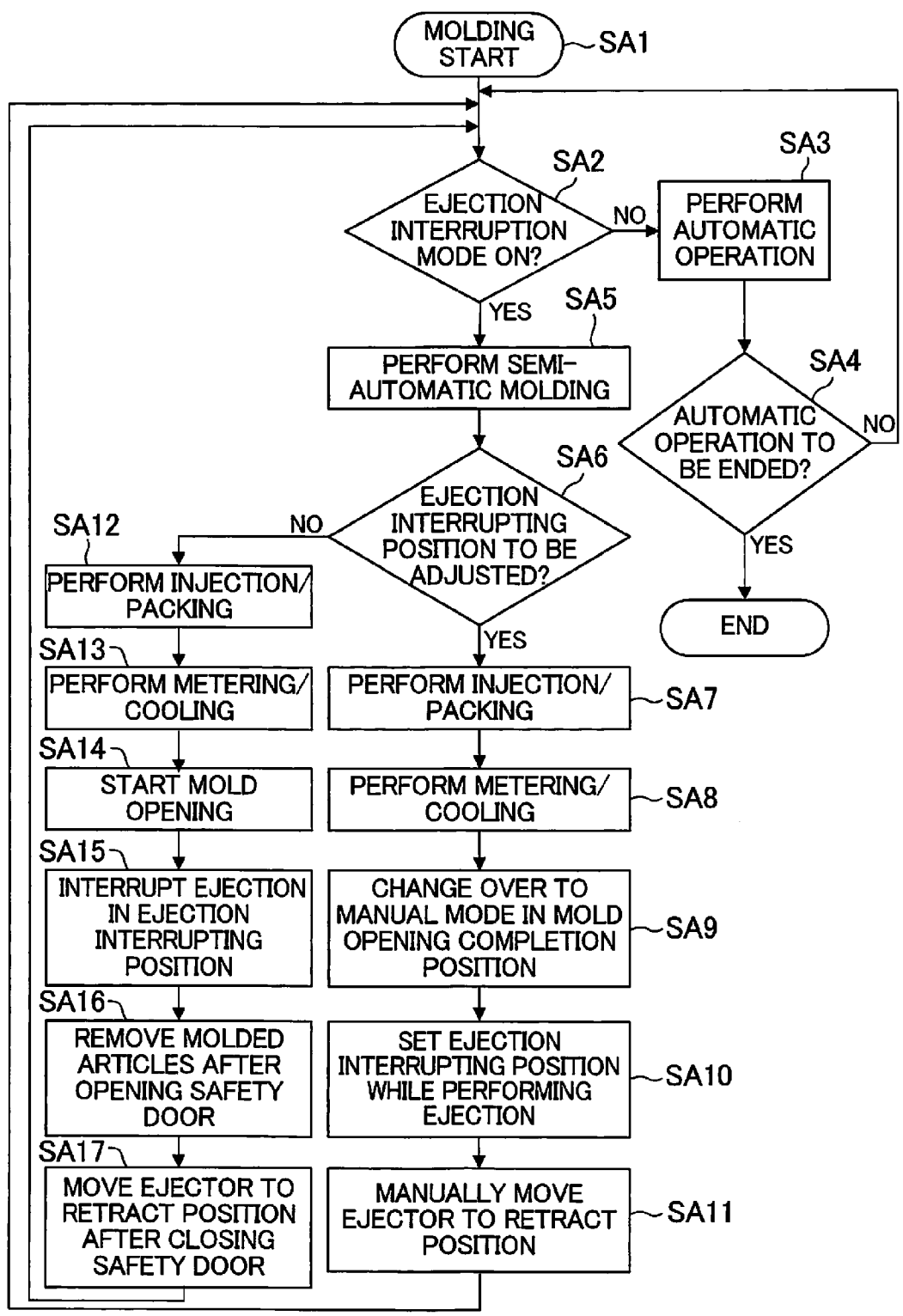
FIG. 6 is a flowchart showing the operation of the first embodiment of the ejection controller for the injection molding machine according to the present invention.

FIG. 6 is a flowchart showing the operation of the first embodiment of the ejection controller for the injection molding machine according to the present invention. The following is a sequential description of various steps shown in this flowchart.

[Step SA1] Molding is started.

[Step SA2] It is determined whether or not the ejection interruption mode is ON. If the ejection interruption mode is ON (YES), the processing proceeds to Step SA5. If not (NO), the processing proceeds to Step SA3.

[Step SA3] The injection molding machine is automatically operated.

[Step SA4] It is determined whether or not to terminate the automatic operation. If the automatic operation is to be terminated (YES), the processing ends. If not (NO), the processing returns to Step SA2.

[Step SA5] Semi-automatic molding of the injection molding machine is performed.

[Step SA6] It is determined whether or not to adjust the ejection interrupting position. If the ejection interrupting position is to be adjusted, the processing proceeds to Step SA7. If not (NO), that is, if the adjustment is unnecessary because the ejection interrupting position is already fixed, for example, the processing proceeds to Step SA12.

[Step SA7] An injection/packing process is performed.

[Step SA8] A metering/cooling process is performed.

[Step SA9] Changeover to the manual mode is effected in a mold opening completion position.

[Step SA10] Ejection is performed as the ejection interrupting position is set.

[Step SA11] The ejector is manually moved to an ejector retract position, whereupon the processing returns to Step SA2.

[Step SA12] The injection/packing process is performed.

[Step SA13] The metering/cooling process is performed.

[Step SA14] Mold opening is started.

[Step SA15] The ejection is interrupted in the ejection interrupting position stored in the ejection interrupting position storage unit.

[Step SA16] The safety door is opened and the molded articles are removed.

[Step SA17] The safety door is closed and the ejector is moved to the ejector retract position, whereupon the processing returns to Step SA2.

A second embodiment of the ejection controller for the injection molding machine according to the present invention will now be described with reference to FIGS. 7 to 9.

While the ejection interrupting position is set manually in the first embodiment described above, this second embodiment is characterized in that the ejection interrupting position is determined and set automatically. The configuration of the injection molding machine 1 is the same as that of the first embodiment.

Figure 7:
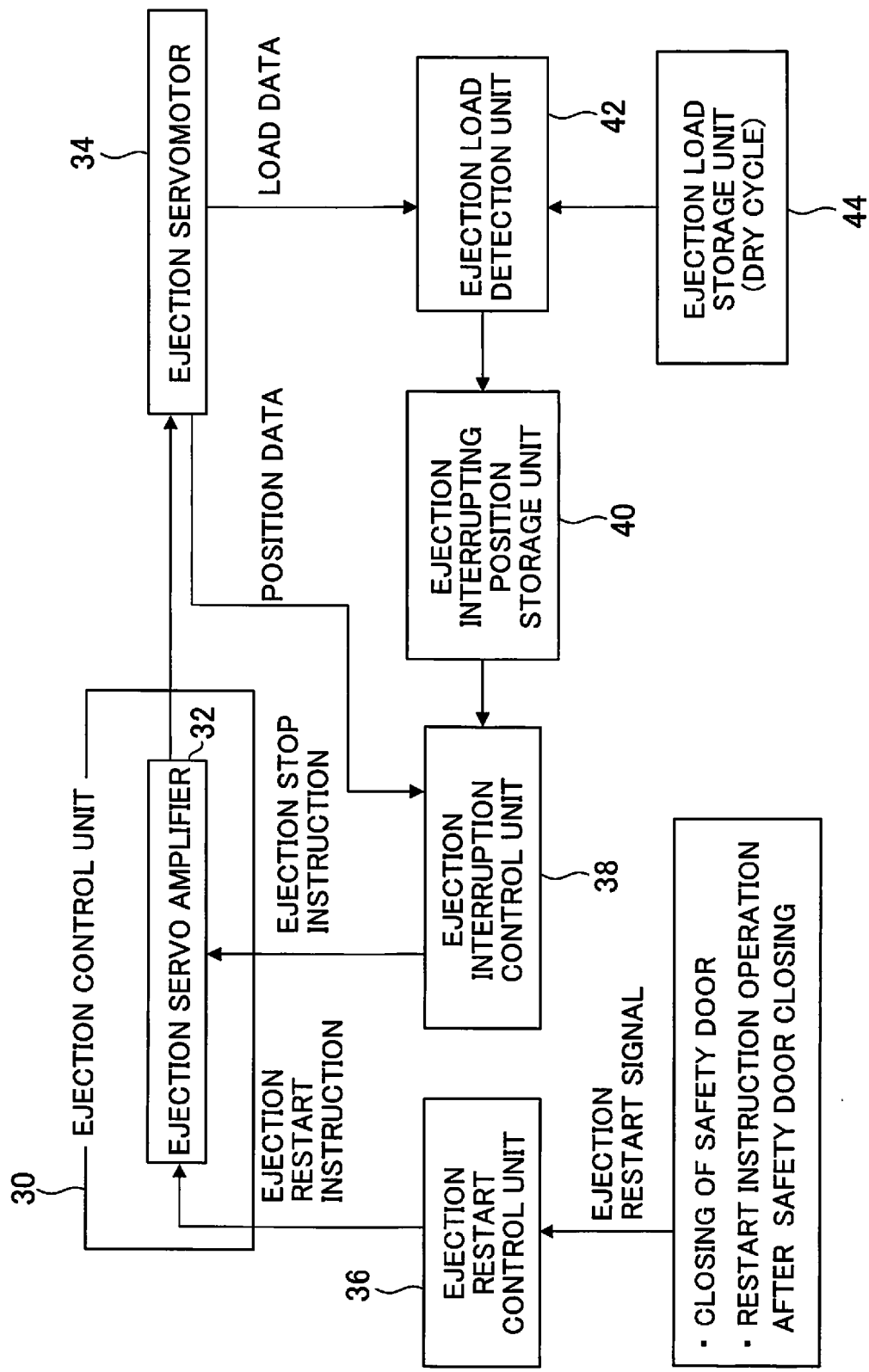
FIG. 7 is a diagram showing the configuration of an ejection control unit of a second embodiment of the ejection controller for the injection molding machine according to the present invention and its surroundings.
Figure 8:
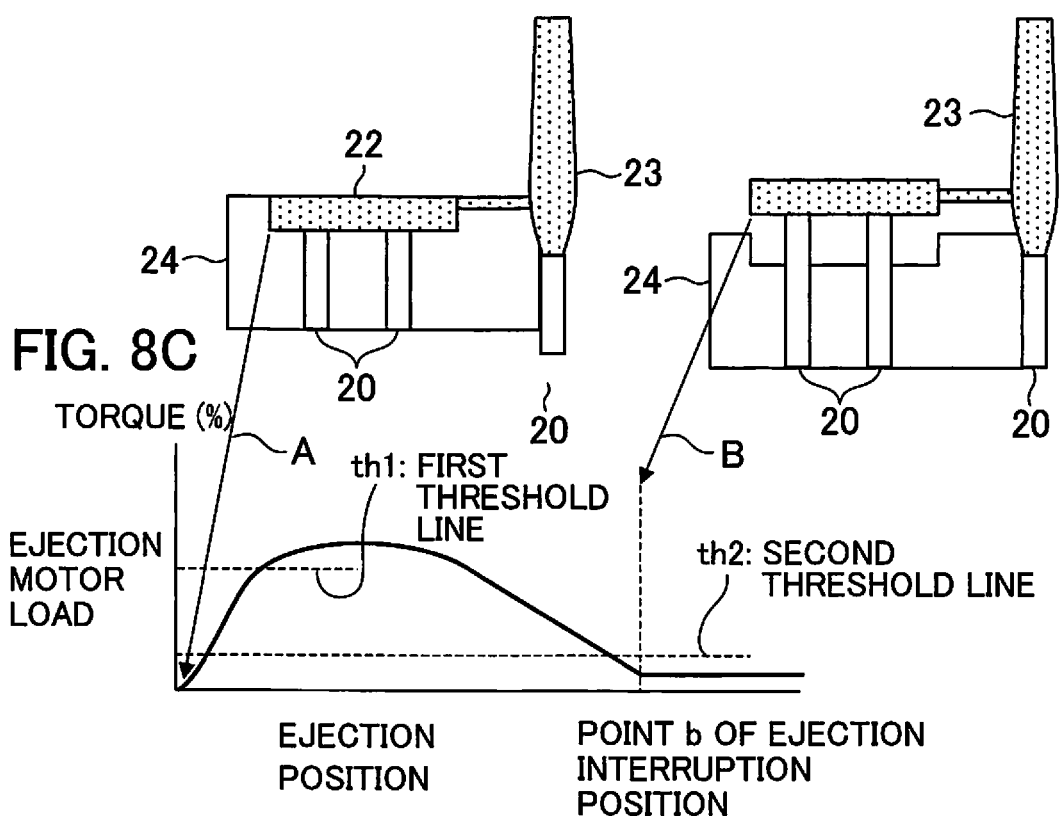
FIGS. 8A to 8C are diagrams illustrating setup procedures for a threshold and an ejection interrupting position performed by the second embodiment of the ejection controller for the injection molding machine according to the present invention.

FIG. 7 is a diagram showing the configuration of an ejection control unit of the ejection controller for the injection molding machine according to the second embodiment and its surroundings.

An ejection control unit 30 comprises an ejection servo amplifier 32 inside and serves to control the positions of an ejector 14 and ejection pins 20*a* and 20*b*. A signal from the ejection servo amplifier 32 is input to an ejection servomotor 34 such that the position of the ejection pins 20*a* and 20*b* is controlled.

An ejection interruption control unit 38 receives position data on the ejection pins 20*a* and 20*b* as an input from the ejection servomotor 34 and issues an ejection stop instruction to the ejection servo amplifier 32 in the ejection control unit 30. An ejection restart control unit 36 issues an ejection restart instruction after the ejection is interrupted. For the ejection restart instruction, as shown in FIG. 5, an ejection restart signal is output when closing of a safety door 10 is detected or when a restart instruction operation is performed after the closing of the safety door 10 is detected. Based on the output ejection restart signal, the ejection restart instruction is issued from the ejection restart control unit 36 to the ejection servo amplifier 32 in the ejection control unit 30.

Load data on a load detection value from the ejection servomotor 34 is input to an ejection load detection unit 42. Further, an ejection load storage unit 44 is stored with a load detection value obtained in a dry cycle (described later), and this dry-cycle load detection value is input to the ejection load detection unit 42. The ejection load detection unit 42 calculates the ejection interrupting position by a calculation method described later, based on the load data on the load detection value from the ejection servomotor 34 and the dry-cycle load detection value from the ejection load storage unit 44. The ejection load detection unit 42 outputs the calculated ejection interrupting position to an ejection interrupting position storage unit 40. The ejection interrupting position storage unit 40 stores the input ejection interrupting position and outputs it to the ejection interruption control unit 38 as required.

In this embodiment, the injection molding machine is provided with the ejection load detection unit 42 so that the value of the ejection load of the ejection servomotor 34 can be detected by performing a cycle operation (or the "dry cycle") on the side of a mold clamping unit without injecting a resin. The difference between the ejection load value in the dry cycle and that for the case in which the resin is injected for molding forms a load or a mold release resistance that is produced when molded articles are released from a mold. A point in time when the mold release resistance disappears is the time point when the molded articles naturally drop by their own weight as they are released from the mold. Thus, if a threshold is set based on the ejection load in the dry cycle, the start of the mold release following the start of the ejection and the dropping of the molded articles after completion of the mold release can be determined.

A specific method for setting the threshold will be described later. In making the determination described above, the threshold may be settled based on detection values for the entire range of movement in a molded article ejection process in the dry cycle or on a detection value obtained when the mold release resistance disappears. The load detection value may be the current value or torque of the ejection servomotor 34, a speed deviation obtained when the ejection is performed with a limited driving force, or the like.

When the mold release resistance for each molding cycle is stable, moreover, the ejection interrupting position set based on the threshold may be previously stored in the ejection interrupting position storage unit 40 so that the ejection can be interrupted in the stored ejection interrupting position.

Referring now to FIGS. 8A to 8C, there will be described setup procedures for the threshold and the ejection interrupting position performed by the ejection controller for the injection molding machine.

FIG. 8A shows a point in time when the ejection pins 20*a* and 20*b* start to contact the molded articles 22*a* and 22*b* and a molded article sprue 23. FIG. 8B shows a point in time when the mold release by the ejection pins 20a and 20b is almost completed. Further, FIG. 8C is a diagram showing the relationship between an ejection position of the ejection pins 20a and 20b and the torque (load detection value) of the ejection motor. The torque of the ejection motor in FIG. 8C is given by a deviation from the torque of the ejection motor in the dry cycle.

A point at which ejection pins 20 shown in FIG. 8A start to contact a molded article 22 and the molded article sprue 23 corresponds to a start point of a curve shown in FIG. 8C (see arrow A). The torque value increases based on friction with a movable mold half 24, mold release resistance from the movable mold half 24 on the bottom surface of the molded article 22, and the like. When the bottom surface of the molded article 22 is released from the mold half 24, the rate of increase of the torque value is reduced. The then torque value of the ejection servomotor 34 is set as a first threshold (dotted line th1). Since the molded article 22 is subject to friction with a side surface of the movable mold half 24 only, thereafter, the rate of increase of the torque is reduced. As the area of contact between the molded article 22 and the side surface of the mold half 24 is reduced, thereafter, the torque value of the ejection servomotor 34 gradually decreases. When the release of the molded article 22 from the mold half 24 is completed, the torque value of the ejection servomotor 34 is fixed.

A second threshold (dotted line th2) is set just before the torque value of the ejection servomotor 34 is fixed so that it is a little larger than the fixed torque value of the ejection servomotor 34. If the ejection servomotor 34 is stopped in an ejection interrupting position when its torque value falls below the second threshold, the ejection servomotor 34 can be interrupted just before the ejection of the molded article is completed so that the molded article drops. Thus, the molded article 22 can be selectively removed without being damaged.

Figure 9:
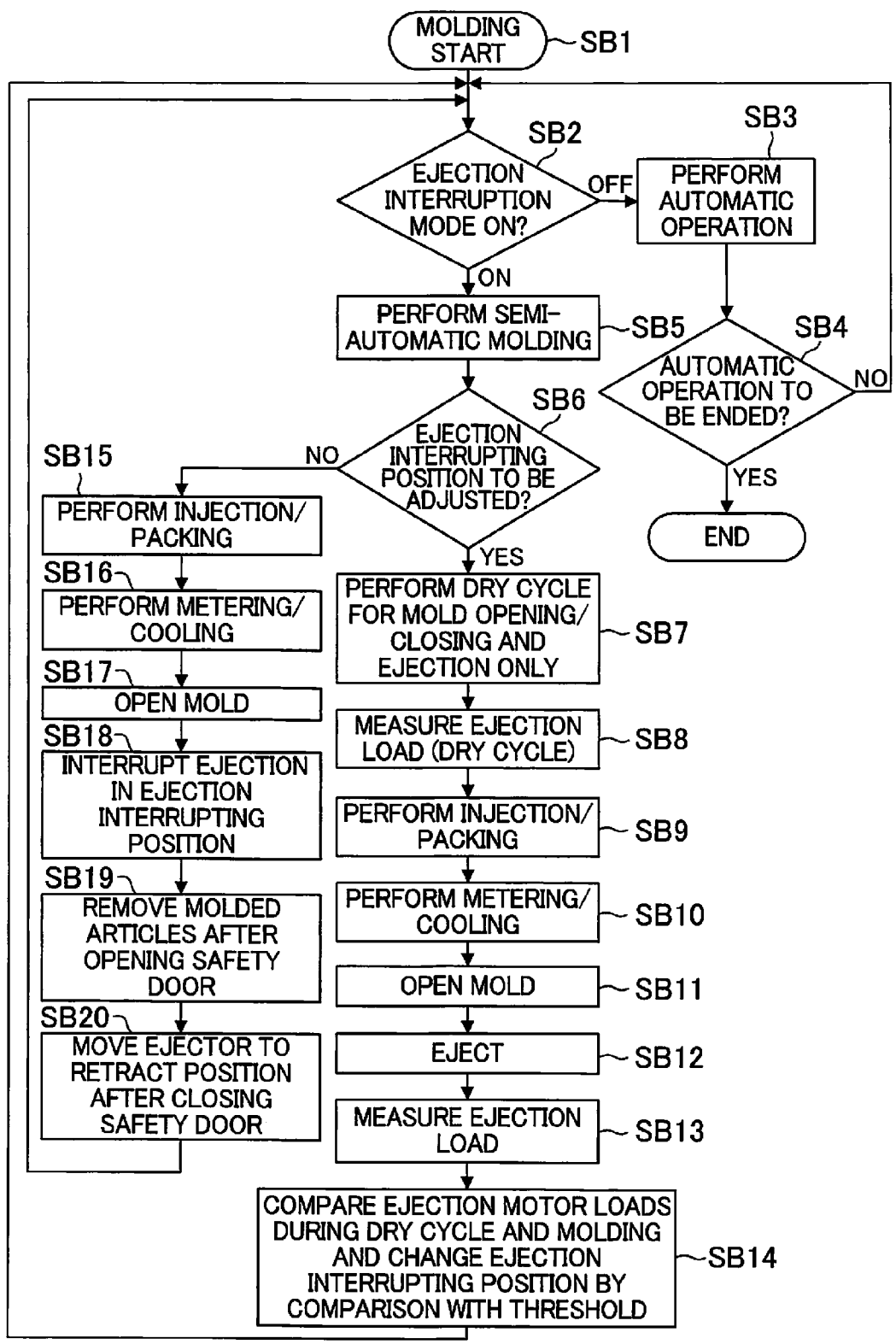
FIG. 9 is a flowchart showing the operation of the second embodiment of the ejection controller for the injection molding machine according to the present invention.

FIG. 9 is a flowchart showing the operation of the second embodiment of the ejection controller for the injection molding machine according to the present invention. The following is a sequential description of various steps shown in this flowchart.

[Step SB1] Molding is started.

[Step SB2] It is determined whether or not an ejection interruption mode is ON. If the ejection interruption mode is ON, the processing proceeds to Step SB5. If not, the processing proceeds to Step SB3.

[Step SB3] The injection molding machine is automatically operated.

[Step SB4] It is determined whether or not to terminate the automatic operation. If the automatic operation is to be terminated (YES), the processing ends. If not (NO), the processing returns to Step SB2.

[Step SB5] Semi-automatic molding of the injection molding machine is performed.

[Step SB6] It is determined whether or not to adjust the ejection interrupting position. If the ejection interrupting position is to be adjusted, the processing proceeds to Step SB7. If not (NO), that is, if the adjustment is unnecessary because the ejection interrupting position is already fixed, for example, the processing proceeds to Step SB15.

[Step SB7] A dry cycle for mold opening/closing and ejection only is performed.

[Step SB8] The ejection load is measured in the dry cycle.

[Step SB9] An injection/packing process is performed.

[Step SB10] A metering/cooling process is performed.

[Step SB11] Mold opening is performed.

[Step SB12] Ejection is performed.

[Step SB13] The ejection load is measured during molding.

[Step SB14] Ejection motor loads during the dry cycle and the molding are compared and the setting of the ejection interrupting position is changed based on comparison with the set threshold, whereupon the processing returns to Step SB2.

[Step SB15] The injection/packing process is performed.

[Step SB16] The metering/cooling process is performed.

[Step SB17] The mold opening is performed.

[Step SB18] The ejection is interrupted in the ejection interrupting position stored in the ejection interrupting position storage unit.

[Step SB19] The safety door is opened and the molded articles are removed.

[Step SB20] The safety door is closed and the ejector is moved to an ejector retract position, whereupon the processing returns to Step SB2.

In the first and second embodiments described above, the safety door 10 of the mold clamping unit is opened and the molded articles 22a and 22b are removed after the ejection is stopped in the ejection interrupting position. When the closing of the safety door 10 is completed, thereafter, the ejection restart signal is input to the ejection restart control unit 36 so that the molding is allowed to be continued. Alternatively, the molding may be continued in such a manner that the ejection restart signal is input to the ejection restart control unit 36 when a restart instruction is separately input after the closing of the safety door 10 is completed.

Depending on the mold used, ejection during molding may be started in a predetermined position after the start of mold opening and before the completion of the mold opening. In this case, the ejection is performed in parallel with the mold opening. In such a situation, the mold opening may also be stopped as the ejection is stopped for interruption. Thus, the molded articles can be more easily removed.

Normally, a position in which the ejection is interrupted is intermediate between retracted and advanced ejection positions. If the ejection is restarted from an interrupted state, therefore, the ejector or ejection device is retracted to the retracted ejection position after advancing from the position in which the ejection is interrupted to the advanced ejection position. If the removal of the molded article is completed with the ejection interrupted, in this case, the ejection device may be retracted from the position of ejection interruption to the retracted ejection position without being advanced to the advanced ejection position when the ejection is restarted. Thus, in restarting the ejection from the interrupted state, the ejection device may be retracted to the retracted ejection position after it is advanced to the advanced ejection position, or alternatively, may be retracted from the position of ejection interruption to the retracted ejection position without being advanced.

The invention claimed is:

1. An ejection controller for an injection molding machine, the injection molding machine comprising:
a mold clamping unit;
an injection unit;
a mold unit;
an ejection device for releasing a molded article of a resin from the mold unit after the resin injected from the injection unit into the mold unit is molded; and
a cover unit provided at least around the mold clamping unit and comprising a safety door configured to be opened and closed, the ejection controller comprising:
an ejection interruption control unit configured to, in response to position data indicating that the ejection device is at a predetermined ejection interrupting position, interrupt ejection by the ejection device before the ejection is completed;
a safety door closing detection unit configured to detect closing of the safety door in an open state; and
an ejection restart control unit configured to restart the ejection by the ejection device when the safety door closing detection unit detects the closing of the open safety door while the ejection device is interrupted by the ejection interruption control unit.

2. An ejection controller for an injection molding machine,
the injection molding machine comprising:
a mold clamping unit;
an injection unit;
a mold unit;
an ejection device for releasing a molded article of a resin from the mold unit after the resin injected from the injection unit into the mold unit is molded; and
a cover unit provided at least around the mold clamping unit and comprising a safety door capable of being opened and closed,
the ejection controller comprising:
an ejection interruption control unit configured to interrupt ejection by the ejection device before the ejection is completed;
a safety door closing detection unit configured to detect closing of the safety door in an open state;
an ejection restart control unit configured to restart the ejection by the ejection device when the safety door closing detection unit detects the closing of the open safety door while the ejection device is interrupted by the ejection interruption control unit; and
an ejection load detection unit configured to detect a value of an ejection load of the ejection device,
wherein the ejection interruption control unit is configured to interrupt the ejection by the ejection device when the ejection load value detected by the ejection load detection unit exceeds a predetermined first threshold after the ejection by the ejection device is started, and thereafter, the detected ejection load value falls below a predetermined second threshold lower than the first threshold.

3. The ejection controller according to claim 2, wherein the first threshold is set based on the ejection load value detected by the ejection load detection unit during a dry cycle.

4. The ejection controller according to claim 2, wherein a position of the ejection device detected when the ejection by the ejection device is interrupted is set as an ejection interruption setting position, and ejection interrupting positions of the ejection device in subsequent cycles are set based on the set ejection interruption setting position.

5. The ejection controller according to claim 1, further comprising an ejection restart instruction input unit of the ejection device, wherein the ejection restart control unit is configured to restart the ejection by the ejection device when an ejection restart instruction signal is input from the ejection restart instruction input unit after the closing of the safety door is detected by the safety door closing detection unit.

6. The ejection controller according to claim 1, wherein the ejection interruption control unit is configured to also stop a mold opening operation when the ejection by the ejection device is interrupted, and the ejection restart control unit is configured to also restart the mold opening operation when the ejection by the ejection device is restarted.

7. The ejection controller according to claim 1, wherein restarting the ejection from the interrupted state includes retracting the ejection device from the predetermined ejection interrupting position.

8. The ejection controller according to claim 1, further comprising an ejection load detection unit configured to detect a value of an ejection load of the ejection device, wherein the ejection interruption control unit is configured to interrupt the ejection by the ejection device when the ejection load value detected by the ejection load detection unit exceeds a predetermined first threshold after the ejection by the ejection device is started, and thereafter, the detected ejection load value falls below a predetermined second threshold lower than the first threshold.

9. The ejection controller according to claim 8, wherein the first threshold is set based on the ejection load value detected by the ejection load detection unit during a dry cycle.

10. The ejection controller according to claim 8, wherein a position of the ejection device detected when the ejection by the ejection device is interrupted is set as an ejection interruption setting position, and ejection interrupting positions of the ejection device in subsequent cycles are set based on the set ejection interruption setting position.

* * * * *